(12) United States Patent
Melas

(10) Patent No.: US 11,140,954 B2
(45) Date of Patent: Oct. 12, 2021

(54) METHOD OF IDENTIFYING AND TRACING GEMS BY MARKING JEWELRY BEARING OR SUPPORTING THE GEMS AND JEWELRY SO MARKED

(71) Applicant: Yianni Melas, New York, NY (US)

(72) Inventor: Yianni Melas, New York, NY (US)

( * ) Notice: Subject to any disclaimer, the term of this patent is extended or adjusted under 35 U.S.C. 154(b) by 378 days.

(21) Appl. No.: 15/608,786

(22) Filed: May 30, 2017

(65) Prior Publication Data

US 2017/0341184 A1 Nov. 30, 2017

Related U.S. Application Data

(60) Provisional application No. 62/342,371, filed on May 27, 2016.

(51) Int. Cl.
*A44C 27/00* (2006.01)
*A44C 17/02* (2006.01)
*G01N 21/87* (2006.01)
*A44C 19/00* (2006.01)

(52) U.S. Cl.
CPC .............. *A44C 27/00* (2013.01); *A44C 17/02* (2013.01); *G01N 21/87* (2013.01); *A44C 19/00* (2013.01)

(58) Field of Classification Search
None
See application file for complete search history.

(56) References Cited

U.S. PATENT DOCUMENTS

| 3,959,527 A | 5/1976 | Droege | |
|---|---|---|---|
| 4,016,810 A * | 4/1977 | Szikla | B41J 3/39 101/4 |
| 4,392,476 A * | 7/1983 | Gresser | G09F 3/00 125/30.01 |
| 6,270,122 B1 | 8/2001 | Shadle | |
| 6,532,725 B1 * | 3/2003 | Chia | A44C 11/00 59/35.1 |
| 6,560,955 B1 | 5/2003 | Chia | |
| 8,985,050 B2 | 3/2015 | Von Gutfeld | |

(Continued)

FOREIGN PATENT DOCUMENTS

WO 2003099054 12/2003

OTHER PUBLICATIONS http://blog.beaducation.com/2010/12/silver-black-perfect-for-oxidizing.html, archived by archive.org in 2011 (Year: 2011).*

(Continued)

*Primary Examiner* — Joel G Horning
(74) *Attorney, Agent, or Firm* — Nolte Lackenbach Siegel

(57) ABSTRACT

A method to permanently mark an item of plated jewelry involves creating a laminate of two metals, and upper layer typically formed of a more precious metal such as gold, platinum and palladium that do not readily oxidize laminated onto the surface of a less precious metal, such as silver, which is oxidized to create a dark color (e.g. black). A laser is used to create characters and/or designs in the upper layer by vaporizing portions to effectively remove those portions. This exposes the upper surface of the less precious metal that does become oxidized. An oxidizer, such as liquid sulfur, is used to blacken the silver, typically a dark gray. This allows an easy and inexpensive method of archiving information on jewelry bearing or supporting a gem that describes the supported gem rendering the gem more valuable collectible and traceable.

10 Claims, 3 Drawing Sheets

(56) References Cited

U.S. PATENT DOCUMENTS

| | | | |
|---|---|---|---|
| 9,266,370 B2 | 2/2016 | Jung | |
| 2013/0004789 A1* | 1/2013 | Takahashi | B21C 37/02 |
| | | | 428/601 |
| 2014/0263667 A1* | 9/2014 | Mege | G06K 19/06037 |
| | | | 235/494 |
| 2016/0071440 A1 | 3/2016 | Hibbert | |

OTHER PUBLICATIONS

Computerworld: "De Beers and other jewelry industry giants create blockchains to verify gems" (online). Article written May 10, 2018 Retrieved from the Internet: <URL: https://www.computerworld.com/article/3269440/de-beers-and-other-jewelry-industry-giants-create-blockchains-to-verify-gems.html>, pp. 1-6.

The Diamond Loupe: "Everledger Creating Colored Gemstone Blockchain for Gäbelin Gem Lab" (online). Article Written Oct. 1, 2018, Retrieved from the Internet: <URL: https://www.thediamondloupe.com/origin-tracking/2018-01-10/everledger-creating-colored-gemstone-blockchain-g%C3%BCbelin-gem-lab.html>, pp. 1-3.

The Journal of Gemmology; Gem Traceability (Article): "Blockchain, Chain of Custody and Trace Elements: An Overview of Tracking and Traceability Opportunities in the Gem Industry". (written in 2018). Retrieved from the Internet: <URL: https://www.ssef.ch/wp-content/uploads/2018/Dec. 2018-Cartier-et-al-Traceability-Gems.pdf>, pp. 1-16.

Mining Weekly; "Gemstone mining company Gemfields has again partnered with Swiss gemologist Gübelin Gem Lab to embed nanoparticles proving origin into all Kagem emerald mine emeralds that were sold at auction in Lusaka, in Zambia, in May" (online). Written: Sep. 14, 2018. Retrieved from the Internet: <https://m.miningweekly.com/article/nanoparticle-tech-allows-gemstone-origin-contirrmation-2018-08-30/rep_id:3861>, pp. 1-4.

Forbes Aricle; "The Jewelry industry Prepares for Supply chain Trace-Ability" (online). Oct. 7, 2018, Retrieved from the Internet: <https://www.forbes.com/sites/andreahill/2018/10/07/the-jewelry-industry-prepares-for-supply-chain-trace-ability/#178fba0e5e2e>, pp. 1-6.

The Tracr Vision, "End to end connectivity in the Diamond Industry assures trust" Tracr Website; Oct. 30, 2019, Retrieved from the Internet: https://www.tracr.com>; pp. 1-11.

MicroTrace Solutions "Diamond Provenance", (online), Retrieved from the Internet: https://www.microtracesolutions.com/diamond-provenance, 2019, pp. 1-3.

* cited by examiner

METHOD OF IDENTIFYING AND TRACING GEMS BY MARKING JEWELRY BEARING OR SUPPORTING THE GEMS AND JEWELRY SO MARKED

BACKGROUND OF THE INVENTION

1. Field of the Invention

The invention generally relates to identification and traceability of jewelry and precious Gems mounted on the jewelry and, more specifically, to a method of identifying gems by marking jewelry bearing or supporting the gems and jewelry so marked to maximize contrast, visibility and legibility of the text and/or designs.

2. Description of the Prior Art

U.S. Pat. No. 5,983,238 discloses an identification, tracking and recovery system that includes a central database for electronically storing unique and relevant information of a plurality of gemstones to assist with the recovery of lost or stolen gemstones. The information of each gemstone is stored as a gemstone entry in the database which includes the characteristics of the gemstone, a unique identification number inscribed into a surface of the gemstone by a laser, and personal information of the owner of the gemstone. A user interface enables a user to communicate with a processor which stores and retrieves the relevant information from the database in accordance with an algorithm. The user interface may be located remotely from the database which is located at a central headquarters. The processor is capable of cross-referencing the information of the stored gemstone entry to enable retrieval of a gemstone entry based on any known information, such as the diamond identification number and information pertaining to owner of the gemstone. In addition, the user may flag the gemstone entry of a lost or stolen gemstone to easily identify the status of the ownership of the gemstone and also enable the system. The flagged gemstone entries may then be retrieved to generate a report that lists all of the lost or stolen gemstones stored in the database.

JP2002187398 discloses a surface treating method that comprises the step of forming a masking coating film on at least a part of a non-mirror surface part of a base material having the non-mirror surface part. A pattern on the masking coating film is formed by emitting a laser beam to apply an etching treatment to the base material with the use of a coating film and a mirror polishing process is applied to a region where the etching treatment is applied of the base material to remove the coating film 3. The masking coating film is formed by metal plating or electrodeposition coating. The mirror polishing process is achieved by chemical polishing, mechanical polishing, electrolytic polishing or bright electro-plating.

U.S. Pat. No. 6,476,351 discloses a laser energy microinscribing system, including a semiconductor excited a solid state laser energy source. A cut gemstone mounting system allows optical access to a mounted workpiece. An optical system focuses laser energy from the laser energy source onto a cut gemstone. A displaceable stage is used for moving the gemstone mounting system with respect to the optical system so that the focused laser energy is presented to desired positions on the gemstone. An imaging system is used for viewing the gemstone from a plurality of vantage points and a rigid frame supports the laser. The optical system and the stage are in fixed relation to resist differential movements of the laser and the optical system to increase immunity to vibrational misalignments.

U.S. Pat. No. 8,067,083 discloses an article surface ornamental structure that is easy to work and able to form a decorative pattern. A metal-coated layer is formed by depositing a metal material with metallic luster on a surface of a base material. The metal-coated layer is at least partly provided with a separation part, in which the base material has its surface exposed to create an ornamental pattern due to a difference between the outer appearance of the base material and the metallic luster of the remaining metal-coated layer. With the base material and the metal-coated layer exposed, respectively, each of their surfaces is coated with a clear-coating layer made of synthetic resin material having transmittance in order to protect the surface of the ornamental pattern.

W02013/074105 discloses a method of laser marking articles. In particular it relates to laser marking articles by laser ablating a coating applied to the article which reveals the surface of the article underneath, thereby forming the mark by the contrasting appearance between the revealed surface of the article and the adjacent remaining coating. Laser parameters are selected to provide uniform, commercially desirable appearance and avoid damage to the underlying surface while maintaining acceptable system throughput. In particular the laser pulse envelope is tailored to provide desirable appearance while maintaining acceptable system throughput.

U.S. Published Patent Application No. 2013/0004789 discloses application on the surface of a multi-layered metal object, from outside to inside, a pattern formed by reaching a lower layer of metal layers. The pattern is formed by removing metal and effectively controlling the pattern part obtained at the end.

When dealing with better jewelry the metals typically used are precious metals such as gold, silver, platinum. However, when using silver alloys the high contrast is not long lasting because both the area being marked and the surrounding area around the laser or mechanical engraving both oxidize equally with time. So both turn black. Thus the entire surface and engraving both oxidize to a black color with time. This does not result in high contrast and the marking becomes lost in the homogenous dark oxidation of the entire piece.

As suggested above, it is known for diamonds to be laser marked for identification on their side called the girdle. After setting the diamond or other gem in jewelry, especially bezel sets, the laser marked identification on the diamond becomes concealed under the metal it is set making the number useless because it can't be seen and is inaccessible. By laser marking the identification of the diamond on the metal part of the jewelry it is set in including all its gem characteristics like origin, weight and carat weight the stone can always be identified without the gem having to be unmounted. It also follows the gem through the jewelry allowing future identification of the gem. This allows the characteristics of the gem to be maintained through the passage of time making it more collectable and valuable. It is a proven fact that rubies from Burma have more value than rubies from Thailand because in the eyes of the collector, Burma is the historical source for some of the world' was no leaves only 2 o'clock in the s best rubies. This is proven by the labs set up around the world like GIA, Gubelin, etc. that issue gem reports that give the origin of the gem based on inclusions and chemical compositions. Auction houses like Sothebys and Christies always sell their valuable gems not only with certificates that the gems are natural but also with accompanying certificates from labs that issue origin reports of the gems origin. Gems with Origin Reports from certain origins have more value and collectability than others.

Certain gems like Rubies from Burma (Myanmar) are boycotted by the US because of the government's human abuse history. By marking the jewelry with the origin of the gem it makes it easier for consumers to know they are not buying gems which come from countries with bad human rights abuses.

Other examples of attempts at traceability include:

Pearl Age Carbon Dating

There is another technology that's been developed by SSEF Lab in Switzerland that uses carbon dating to give exact age of pearl. Being able to engrave a SSEF certificate number on the jewelry and engrave the matching date the pearl was created will add significant value to the pearls without damaging them allowing that information to follow that pearl in the future together with the jewelry.

Determining the Species of the Pearl and the Documenting it on the Jewelry

Another technology developed is the ability of labs to determine the species of the pearls oyster through non destructive tests. In today's world where origin can make a huge difference in price this guarantees that if he bought an Australian South Seas Salt water pearl, that it's specific to pearls grown in Australia vs fresh water Chinese pearls which look similar but don't demand the value of salt water pearls from Australia.

The same is for the collectors of the famous Basra Pearls that come from the Persian gulf and belong to a specific species of pearls. Basra pearls are the most famous pearls and most highly collected by pearl affectionados and collectors.

The Basra Pearl

The main species of oyster in the Persian Gulf producing these pearls are *Pinctada radiata* (Gulf pearl oyster) However the Basra Pearl supply has dwindled greatly ever since the oil industry boom in the Arab countries. The Basra pearls are a highly valued and treasured species by collectors. These pearls have a featured in recorded history as far back in time as 300 BC.

The Tennessee Pearl is from the "Washboard mussel." which is not an oyster. Tennessee's Official State Gem—the freshwater pearl.

The Australian South Sea pearl oyster (*Pinctada maxima*) is the largest of all pearl oysters.

Tahitian Pearls are *Pinctada Margaritifera* oyster, which is found exclusively in Tahiti and several other French Polynesian islands.

Akoya pearls are from the saltwaters of Japan, grown in the *Pinctada fucata* oyster.

SUMMARY OF THE INVENTION

Accordingly, it is an object of the invention to provide a method of engraving gold-laminated jewelry that does not have the disadvantages inherent in prior art methods.

It is another object of the invention to provide a method of engraving gold-laminated jewelry that is a simple and economical to use.

It is still another object of the invention to provide a method of engraving gold-laminated jewelry that maintains the contract and visibility of the engraved markings over time.

It is yet another object of the invention to provide a method of engraving gold-laminated jewelry that can be used to engrave designs, logos and text.

It is a further object of the invention to provide a method of and engraving text and/or designs on a traditionally less costly precious metal, such as silver, that is laminated with a more costly precious metal such as gold, platinum or palladium that comprises an item of jewelry, such as a ring, bracelet, necklace, charm or earrings or the like that mounts a precious stone identified and/or described by the engraved text and/or designs.

It is yet a further object of the invention to provide a method of identifying gems by marking jewelry bearing or supporting the gems and jewelry so marked so that the jewelry and the gems can be identified and traced.

It is still a further object of the invention to provide a method of identifying gems by marking jewelry bearing or supporting the gems as in the previous object to archive important, critical or interesting information about gems mounted on an item of jewelry to make it more collectible and salable.

To achieve these objects, and others of that will become apparent hereinafter, the method involves creating a laminate of two metals, and upper layer typically formed of a more precious metal such as gold, platinum and palladium that do not readily oxidize laminated onto the surface of a less precious metal, such as silver, which is oxidized to create a dark color (e.g. black). A laser is used to create characters and/or designs in the upper layer by vaporizing portions thereof with a laser to effectively remove those portions. This exposes the upper surface of the less precious metal that does become oxidized. An oxidizer, such as liquid sulfur, is then used to blacken the silver, typically a dark gray. However, if more contrast is needed by making the marked text, designs etc. darker than gray a second step can be used by applying a further oxidizing agent to turn the dark gray to substantially black.

BRIEF DESCRIPTION OF THE DRAWINGS

Those skilled in the art will appreciate the improvements and advantages that derive from the present invention upon reading the following detailed description, claims, and drawings, in which:

FIG. 4 illustrates another method of marking on other materials such as high tech ceramics, metal oxides, mother of pearl and the like.

DESCRIPTION OF A PREFERRED EMBODIMENT

Figure 1:
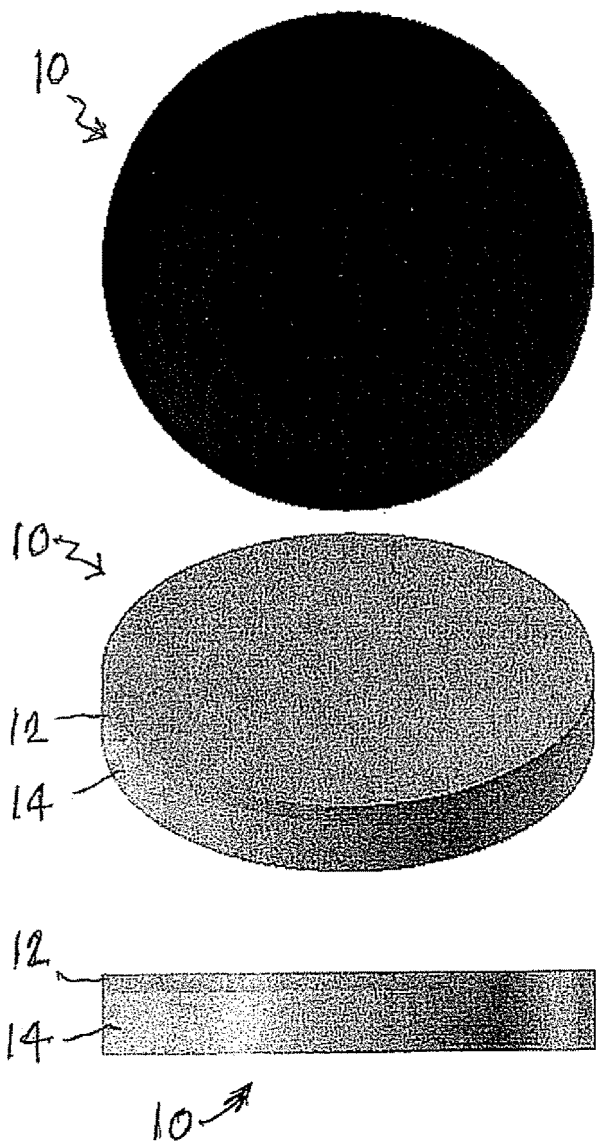
FIG. 1 includes top plan, perspective and side elevational views (from top to bottom) of an exemplary plated item representing an item of jewelry, such as a charm, prior to engraving in accordance with the invention.

Referring now specifically to the Figures, in which the identical or similar parts are designated by the same reference numerals throughout, and first referring to FIG. 1, an exemplary plated item representing an item of jewelry, such as a charm, is generally designated by the reference numeral 10.

The plated item 10 is formed as a laminate of two metals, and upper layer 12, typically formed of a more precious metals such as gold, platinum or palladium that does not readily oxidize laminated or otherwise applied onto the surface of a less precious metals, such as silver 12, which does oxidize to create a darker color (dark gray or black). A laser (not shown) is used to create characters and/or designs in the upper layer 12 by vaporizing portions thereof to effectively remove selected portions. The removal of selected portions of the upper layer 12 exposes the upper surface of the less precious metal 14 that can be oxidized.

Figure 2:
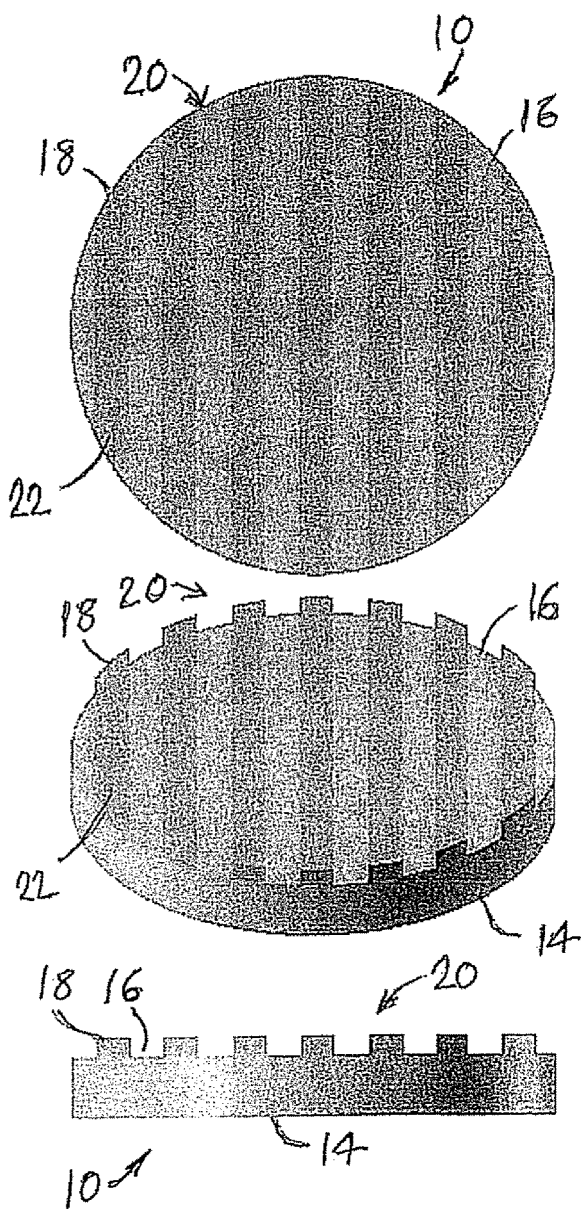
FIG. 2 is similar to FIG. 1, showing the same views of the item of jewelry after it has been engraved with a design.

In FIG. 1, the lower layer 14 supports the upper layer 12 that is a more precious metal such as gold, platinum or palladium. A laser may be utilized to remove portions of selected areas by vaporizing them in the upper layer 14 to create recesses 16 to expose the upper surface of the lower layer 14. In the illustration shown in FIG. 2 straight laser grooves 16 are shown only to illustrate the method. Clearly, a laser can be used to create complex shapes, text, the characters etc. Once the grooves 16 are created the upper surface of the lower base metal is oxidized in any suitable conventional manner to create the dark areas 22 that are visible through the remaining portions of the upper layer 11. Information can be marked in this manner with the width of the lines 16 being as small as 0.1 mm. It is anticipated that for most practical applications the widths of the removed materials to create text will range between 0.10 mm to 0.2 mm. The thickness of the lower layer of the silver can be approximately 0.9 mm although, clearly, the thickness of the lower layer can be any suitable thickness as it does not directly influence the features and benefits of the invention. The printed characters may or may not be visible to the naked eye although, clearly, the characters, letters or other information can be made as large as desired that would then be visible to the naked eye.

Gold, platinum and palladium do not oxidize when exposed over long periods of time or exposed to corrosive materials such as a sulfur. However, sulfur causes relatively quick reaction in silver and oxidizes the silver to make it turn gray or dark gray, commonly recognized as the tarnishing of the silver. To provide more contrast or enhance legibility it is a possible to further treat the upper surface of the silver layer 14 to change the gray color to nearly black.

An important feature of the invention is the blackening of the designs and letters once chemicals are used to oxidize the silver area exposed. The trade usually uses liquid sulfur as an oxidizer to blacken the silver. However that color is not a true black. After years of experimenting it has been found that the letters and designs can be made to stand out more and become a true black by adding a second chemical over the silver blackened by the sulfur. The difference is significant. The sulfur alone produces more of a dark Gray. However, the addition of a layer of an extra chemical can help to darken the exposed upper surfaces of the lower layer 14 can protect the inscription and enhance the contrast and legibility of the printed text and/or design. But the result is visibly noticeable and letters stand out more. To optimize or maximize the contrast, a first oxidizer, a sulfur can be used. This first step may be referred to as "sulfur oxidation of silver." This turns it from silver to dark gray. A second step is advantageously adding an additional stronger "liquid oxidizer" on top of the dark gray of the oxidized gray silver. This causes the exposed surfaces of the silver lower layer to change from dark gray to almost pure black making the text and/or designs to stand out more. However, this is an optional step as the gray or dark gray generated by the initial oxidation may be sufficient.

This method can be used to permanently mark the surface with critical important information and this can be used to identify various objects, including gems or other objects that are identified so that they can be traced, located all collected. Unlike in the prior art that, however, the gems are identified by marking or notation of relevant information on a plated laminate suggested that mounts who supports the precious gem. The gem itself need not be marked since the information that can practically be written onto a very small surface of the gem is rather limited and even that information can be hidden and, therefore, and accessible once at the gem is mounted on an item of jewelry, such as a pendant, bracelet, ring, earings and the like.

The method of the invention allows for lettering for jewelry descriptions and designs to be clearly seen without fading. Most laser engraving is done on one metal and the lettering or design is the same color as that of the metal being marked or etched. The use of two metals allows for a black or dark lettering after oxidation process. This makes text or a design more prominent. This occurs because of the use of two metals that are sandwiched together. One of the two metals is non oxidizing metal such as gold of all karats, palladium, platinum group of metals, stainless steel, titanium, non oxidizing silver.

By laser engraving silver alone, the laser mark is visible for very short time. As time passes and silver on surface surrounding lasered area oxidizes the lasered lettering and it becomes far less visible eventually not being visible at all as the entire piece becomes oxidized and dark gray or black. (oxidized or tarnished).

Laser engraving metals which are non oxidizing such as gold, platinum, palladium and non-oxidizing precious metals results in lettering and designs that can be seen only through the difference in the texture of the area being lasered. The lettering is the same color of the metal not a black or dark color which can be easily seen. Because the surrounding metal as well as lasered area is non oxidizing the result will remain same as time passes.

Figure 4:
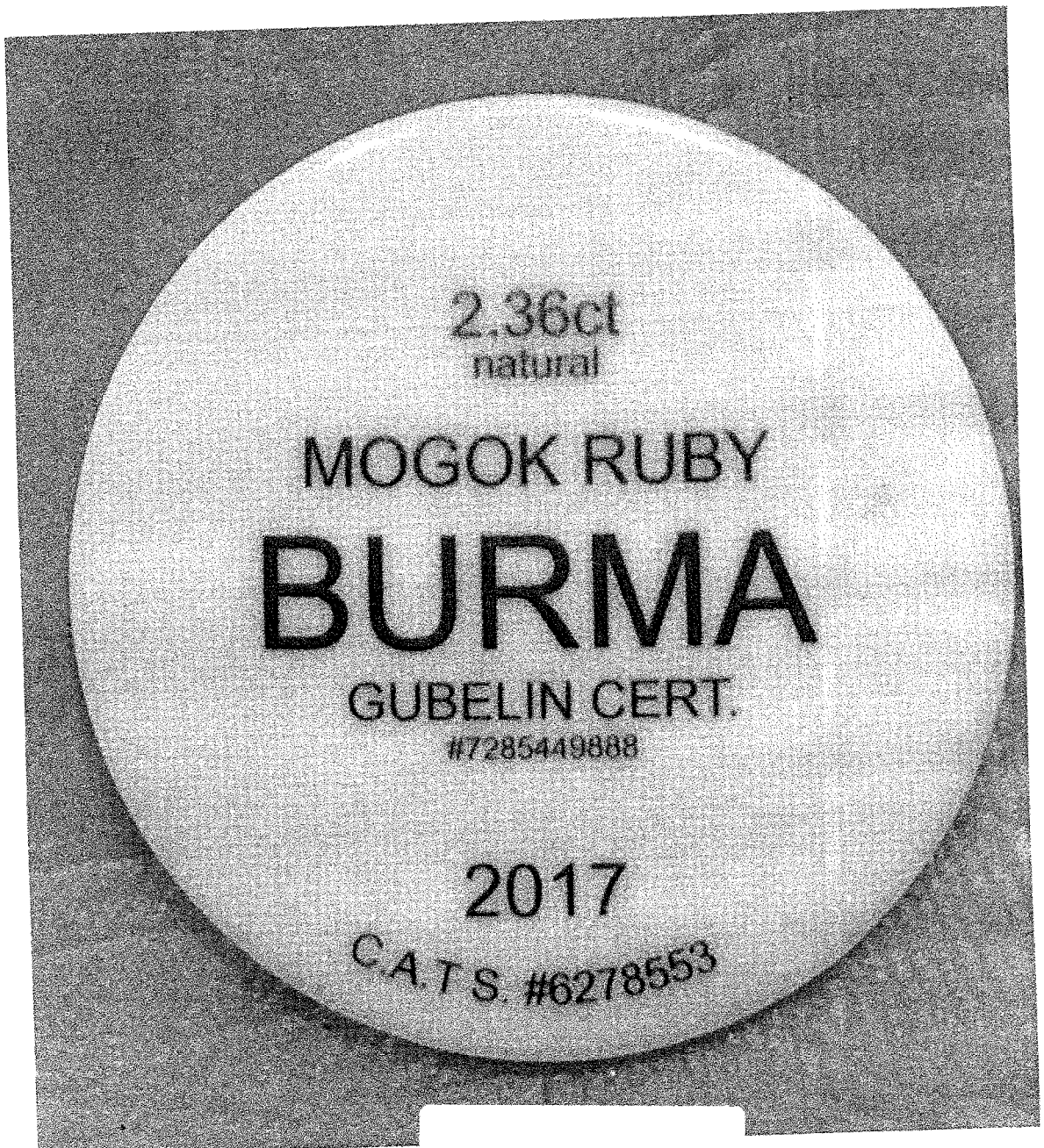

In addition to using high contrast "engraving" of laminated jewelry other forms of high contrast markings may be used for traceability. Referring to FIGS. 4 and 5, for example, the heat from a laser can burn high tech ceramic or cerium oxide allowing the jewelry to be permanently marked with all the details. Such a cerium oxide plate can be attached to the jewelry charm, pendant, cuff, ring etc, like a wine bottle label, except it's a part of the jewelry. High tech ceramics which include Zirconium Oxide ceramics and Cerium Oxide Ceramics, can be used for this purpose.

In FIG. 4, a 15 mm diameter round by 1 mm thick Gold Overlay plate is illustrated that has been engraved by laser. The gold layer on the top is 0.10 mm thick and the silver layer below it is 0.90 mm thick. For a total of 1.0 mm. By lasering below the depth of the gold of 0.10 thick layer we vaporize the top layer of the gold thus exposing the silver layer below. The particular depth for this sample was lasered at 0.20 mm deep to vaporize the gold and reach the silver layer. The silver exposed area under is clearly silver. This sample was purposely not treated with oxidation to the silver to show the exposed silver below. Once oxidizing chemicals applied to this sample, all the silver exposed areas will turn dark black and the gold will remain, as it doesn't oxidize. After this process the entire piece will be polished on a flat polishing wheel of felt thus creating very precise lettering that is high in contrast between the gold and the black oxidized lasered area. The dark areas around the lettering is due to the dust and smoke from the metal vaporizing and will become crisp and defined after polishing. After the letters are engraved a deeper high powered laser cut at the circumference of the circle at 1 mm deep will cut the piece completely out it can be set with the gem.

Gold, Silver, Platinum or other precious metal inlay in precious, semi precious, synthetic or ceramic composites.

The method is used by class ring companies like Balfour and SB of Germany to create gold inlay initials, designs etc but not for identifying gems, their origin and traceability. This method can be used to create the front side of the charm with the most important details about the gem like MOGOK BURMA RUBY. The rest of the details can be lasered on the high contrast gold overlay or lasered ceramic plate. This method is for creating eye visible details about the gem being documented adding to its marketability and collectability.

Stainless steel is an excellent surface to mark on because of its carbon content causing a black inscription when lasered without need to darken the inscriptions. Because Stainless Steel contains carbon in its chemical composition the laser automatically burns a dark high contrast font and descriptions of the gems. This process does not require the use of overlay precious metals combined with creating the dark black tarnish required to create the high contrast. Stainless steel is an alternative to using expensive precious overlay metals and is still able to permanently mark the jewelry but for jewelry requiring more affordable collections. Stainless steel lasering is an available technology but never applied to documenting the details of the gem as well as creating creating traceability of the gem.

An important feature of the invention is the use of the jewelry marking method to inscribe all the important or salient properties of the gem or gems that are mounted on or supported by the jewelry that is inscribed. Examples of information that can and would normally be inscribed or marked include the following:

1. Reference to Lab Certificate Number

This reference number allows traceability of a gem by lasering the number on the jewelry allowing traceability of the gem to its certificate. Traceability to its certificate number allows jewelry to always keep the value based on the certificate issued. Furthermore, by inscribing the certificate number on jewelry it allows gems that cannot be lasered on the gem itself to be traceable through the number labeled on the jewelry metal. Most gems with the exception of diamond cannot be lasered on their girdle or anywhere on gem because of durability and loss of value problems because lasering destroys a genies value as well as potentially damaging it. Furthermore in gems that are set with prongs or bezel setting, the number of the certificate number is hidden under the setting.

2. Name of Continent, Country and City Mined.

By lasering or inscribing or casting the name of the continent, country or mine on the jewelry the source where the gem was mined remains forever traceable adding to the value and romance of the gem.

3. Treated or Natural Gem

By labeling the gem as being totally natural without any treatment the gem never loses its value. If treated it also identifies the gem as treated.

4. Cut at the Source "C.A.T.S."

This certificate supports benefits to the local population by giving indigenous people in a locality or region the ability to benefit from the gems mined in their country. By labeling it C.A.T.S.—certified it supports the transparency of where a gem was cut.

5. Year Gem was Mined or Discovered.

This adds to the information that helps a gem to be more traceable and collectable because it has a year it was mined or discovered labeled. Like wine the year adds to the romance and value of the gem.

6. Name of Gem

Because many gems look alike, by labeling the name of the gem the gem becomes more valuable as well as collectable. Also the value increases because some sources are historically more valuable than others even if they look alike or share similar physical properties. This adds to the traceability of the gem as well as its collectability value. For example emeralds from Colombia come from several mines within the same country. By labeling the source of the particular mine the traceability of the mine is never lost as the jewelry is passed on from generation to generation adding to the traceability of the gem.

7. Grade of Diamond or Gem.

By adding the diamond or colored gem grade on the jewelry by labeling it, it allows the diamond or gem to be traceable. Currently most diamonds are laser inscribed in the stone itself not on the jewelry. When lasered on the gem it's usually on the girdle and too small to be seen by the naked eye. This doesn't allow the wearer to be proud of others seeing what their gem is graded as especially if it's a better grade. By inscribing the jewelry itself the diamond or colored gem grade can be proudly seen by others adding more value to finer gems. By labeling the jewelry the jewelry becomes more collectable and valuable because the gem quality is traceable.

8. Carat weight of Gem.

Once a gem is set it's difficult to weigh its carat weight and requires the gem to be unmounted and weighed to get exact weight. By labeling the carat weight of the gem the weight of the gem remains traceable through generations of the gem being passed on allowing the gem to be more collectable and adding value without mounting the gem.

9. Trademark Name

Many gems are identified by their trademark name instead of its gemological name. By adding name of trademark in the labeling process of the jewelry it allows the gem to be marketed properly by its trademark adding value, romance, traceability as well as collectability.

10. Name of Animal, Metal or Plant Species and or Origin.

Dinosaur bones for example can be found petrified and cut into gems. By labeling the name of the dinosaur on the jewelry the traceability of the petrified bone and species is maintained through the life of the jewelry. It also has more collectability because it allows people to collect several species of dinosaur without ever confusing which species each piece is. Same applies for other fossilized animals as well as plant and tree species which are also fossilized including fossilized wood from specific locations. This includes meteorites or other collectibles like ancient glass, clay fragments and amber.

11. Name of Rough Gems

This allows gems that are left uncut and in their natural state to be collected because of their origin and for those collecting crystals instead of cut gems. By labeling jewelry the gem crystal or crystals remains traceable adding to their collectability.

12. Longitude Latitude Coordinates

By labeling jewelry with the coordinates of the mine where their discovery took place this additionally enhances their collectability and historical value.

13. Gemewizard Color Codes

By labeling a color code with Gemological reference the gem maintains its proper Gemological computer generated color grade. This allows collectors to get real color grade without seeing the gem or being influenced by discrepancies in color caused by different cameras etc. this allows the collectability and trading of jewelry without seeing gems from anywhere across the world.

14. Name of Year Metal was Mined.

By documenting the year metal was mined it adds to the value of the jewelry.

15. Name of Country Metal was Mined

By documenting mine and country where metal was mined it adds to collectability of metal. Not just gold but gold from Montana, Colombia, or Greece for example. This allows jewelry to be fully traceable by origin of metal allowing more collectability as well as more value for tourist oriented jewelry because tourists want to buy jewelry sourced from the country they visited as a momento and memory of their trip.

16. Name of Cutter of Gem.

There are cutters in the gem industry whose cuts are collectable. By labeling jewelry with the name of cutter of gem the gem gains value and the name of the cutter is always traceable. Currently these designer cuts lose their designer cut value once the gem is set.

17. Name of Owner of Gem

Allows traceability of a gem in the jewelry by creating traceability based on who purchased the gem and owned it. This is great especially for family jewels passed on through the ages to be traceable to the correct family member. This information also allows a gem to be traced to rightful owner if lost both because of the name of the owner as well as the certificate number.

18. Name of Donor Person giving Gem.

This information allows a person receiving a gem never to forget who gave them the gem adding to the romance of the gem. This is especially important when gems are received from parents, spouses and other family members.

This method of marking information on jewelry supporting gems allows people to collect gems and jewelry without ever losing the information that adds to their collectability value and traceability. The country a gem was mined, the treatment of the gem and the labeling of certificate numbers on the jewelry allows the jewelry to maintain all its information from mines to market without it losing its history when going through the different steps of its creation. And that information is maintained forever. And because people are prouder of the origin of specific gems and the countries they were mined this allows wearer to proudly wear a gem with the source of the gem visible. This adds to the value of the gem not just based on its Gemological value but on its origin value. For example many gems mined in Montana USA are of inferior value because of their color when compared to other international sources. By adding the name MONTANA SAPHIRE on the jewelry the gem gains value because of the collectability of the source vs its Gemological value based on color and other Gemological values. Also some gems from specific mines are more expensive to mine because of weather conditions etc. By adding the name of the source on the jewelry the gem has more of an origin collectability value vs Gemological value based on its grade. This allows gems usually not marketable to find a market based on source rarity vs Gemological value based on equal visual reference.

Thus, the specific method of marking is not critical and the below methods can be used as long as selected information is inscribed on the jewelry or substrate on which a gem is mounted:

OVERLAY OR GOLD FILLED JEWELRY:
GOLD PLATED OR ELECTROFORMED SILVER: If silver sheet metal is masked on one side then when electroformed on the exposed side a thin layer of evenly deposited gold can be electroformed over the silver creating a very strong molecular bond to the silver. This is another way to create a thin layer over the silver sheet which is similar to overlay. Overlay is usually a mechanical bond between one sheet of silver and one sheet of gold or Platinum or palladium or stainless steel. The advantage of overlay is the use of platinum, palladium and stainless steel. With electroforming only gold can be used. The advantage of electroforming is a stronger bond between the gold and silver and less need to recycle the cut off parts of overlay metal sheets.

HIGH TECH CERAMICS AND COMPOSITES: Laser marking information about the gem is best done using Laser marking of overlay (Gold Filled, Layered metal) precious metals like silver, gold, palladium, platinum combinations of metal.

But it can also be done on high tech ceramics, Zirconium oxides composites, Aluminum oxide composites, Cerium Oxide or other high tech composites or other surfaces that allow marking by laser.

High tech ceramics can also provide an excellent surface for marking pertinent information about the gem. Some of these ceramics contain carbon which when lasered burn the carbon leaving a black marking which allows for black inscriptions. Others have a black coating with a white base which when lasered remove the upper layer exposing the layer below creating a very high contrast allowing the inscription to be easily read. Because of new developments in ceramic technology, these composites are extremely durable making their use in long term jewelry use and institution suitable.

MOTHER OF PEARL(MOP)

Because mother of pearl is white it provides an excellent surface to laser information about the gem.

STAINLESS STEEL: Stainless steel is an excellent surface to mark on because of its carbon content causing a black inscription when lasered without need to darken the inscriptions. Because Stainless Steel contains carbon in its chemical composition the laser automatically burns a dark high contrast font and descriptions of the gems. This process does not require the use of overlay precious metals combined with creating the dark black tarnish required to create the high contrast required for legibility of the descriptions of the gems being documented. Stainless steel is an alternative to using expensive precious overlay metals and is still able to permanently mark the jewelry but for jewelry requiring lower value jewelry.

COLORED ENAMEL FILLED ENGRAVED SURFACES. Engraved surfaces like Mother of pearl do not easily allow the laser to mark it black when lasering. This it has a low contrast so it can't be read. It just leaves an engraved area but without contrast. By adding colored enamels into the grooves we can create colored writing with high contrast to the Mother of pearl allowing it to be read. But apart from Mother of Pearl, enamels can be added to metal engraved areas to add color because typical laser engraving on overlay, electroformed areas creates usually only black contrast with the metal.

TRANSPARENT WHITE QUARTZ OR WHITE SAPHIRE: Can be lasered to create lettering that is dull thus allowing marking with lettering.

INLAY: Gold, Silver, Platinum or other precious metal inlay in precious, semi precious, synthetic or ceramic composites. The method is used by class ring companies like Balfour and SB of Germany to create gold inlay initials, designs etc but not gem origins.

RAISED DESCRIPTIVE FONT: In addition to laser inscribing or mechanically engraving jewelry, using raised descriptive font also is an additional method to document the source and description of the gem being used in the jewelry.

Figure 3:
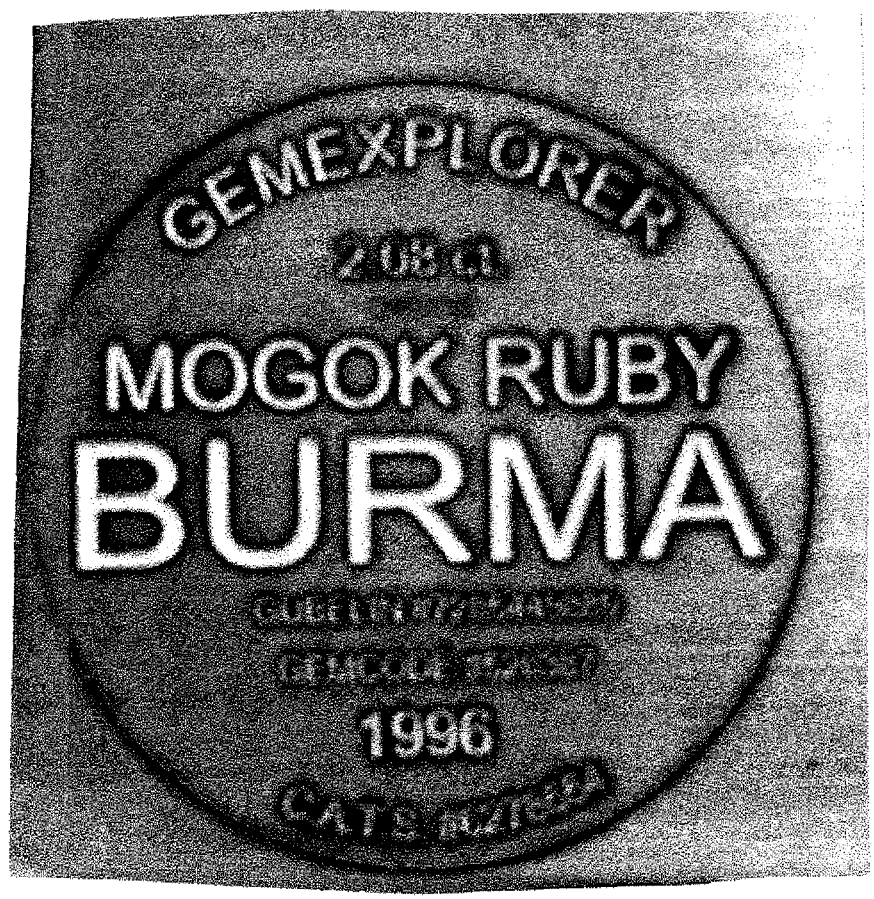
FIG. 3 illustrates a round gold overlay plate engraved by a laser in accordance with the invention.

However because it's far bigger and more visual than laser or CNC inscribing it allows for the main points of the description of the gem to be noticed very easily like the Gemological name of the gem and its source. Using raised font in jewelry has been used for decades to identify the graduation year of class rings, and several other personal choices of the ring owner. But never for visually showing the origin of the gems used in the jewelry. By using alone or combining raised letters with laser inscribed overlay precious metals, high tech ceramics, mother of pearl or stainless steel, the jewelry contains all the information about its Gemological origin and characteristics. This adds to their collectability and value. The strength of the use of descriptive Gemological information isn't just in the use of just a few Gemological descriptions but in the use of several together using at times both raised font to describe the gem and or laser inscribing on the overlay metal, ceramics, MOP, etc FOR EXAMPLE SEE FIGS. 3 and 4.

USES:

DOG TAG JEWELRY—

BEADS: Size of bead, information on clasp or additional jewelry bead. Combining cut gem on clasp with beads on bracelet.

BEAD BRACELETS AND NECKLACES: Creating Traceability will be very important for bead bracelets and necklaces creating better marketability and perceived value. Size of gem bead, information about its origin and year it was mined, total carat weight of bead bracelet. Until now bead bracelets have been manufactured without any collectability. Since nearly 90% of gemstone mines are bead quality rough and only 10% facet gem grade, creating bracelets with beads of a specific mine and origin will create more demand as a collectable. This will support Artisinal cutters in poor countries like single mothers who can support their families by cutting beads. Since nearly 90% of the rough is bead quality this will also be where most of the jobs are. Bead cutting is very simple to teach and there is little fear of theft because of its lower quality vs the gem quality that requires expertise to facet. This will support "C.A.T.S.—Cut At The Source" certification helping bring true beneficiation to people in remote areas where gems are mined. This extra income for bead rough will also help "Artisinal Miners" get more value from their annual production.

CAMEO CARVING—Today Cameo carvings are done on several kinds of shell and by different artists. By using the technology to permanently documenting the name of the shell carved, the year it was completed, the country of origin of the shell, the name of the artist, the carat weight of the cameo, the name of the country it was carved etc we permanently keep all the information about the cameo together with the jewelry piece. This allows artists to create several collectable series of cameos and attract collectors of their work. The fact that all this information documented increases the value of the artists carving by having his name an history relavent to the carving attached to the jewelry piece.

MICROMOSAICS (Micro mosaics)—Micromoasaics are a special form of mosaic that uses unusually small mosaic pieces (tessarae) of glass, or enamel-like material, to make small figurative images. They are usually composed of little glass bricks called tesserae. Packed with 1,500 to 5,000 pieces per square inch, this type of miniature mosaic was first sold in the early and mid-19th century. Today, two other types of jewelry—Florentine "pietra dura" and Venetian mosaic—also fall under the umbrella of micro mosaics from the Victorian era. Cemented to a glass, stone, or metal background and framed, the glass tesserae were originally so small, these mosaics appeared to have been painted or enameled, until they were examined under a microscope.

Unlike Glass micro mosaics, pietra dura—literally "hard stone," it is also called "pietre dare" or Florentine intarsia—is not made of square or rectilinear tessarae but from thin bits of stone carved into specific shapes fitted together like a jigsaw puzzle. These pictures of flowers, birds, butterflies, or other insects were generally set into black marble and framed with metal. Artisans would use stone like malachite, carnelian, and quartz, which mimicked the natural webbing and color gradations of delicate wings and petals, to create stunning, realistic illusions.

ENGRAVING ARTISTS—because of the small area in which engravers work as well as the complexity of the designs, it's hard for artists to have their artwork collected because the space of the artwork doesn't allow for the information about the artist to be documented.

GLASS ART—

MINERALS—

MICRO PAINTINGS—

DESIGNER GEM CUTS—number of facets, whether the cut is award winning, name of cutter.

PRAYER ROPE—By labeling the bracelet with the name of the Monk, priest or Nun as well as the monastery and country the monastery is located we are able to guarantee that the prayer knots are authentic and hand tied vs machine knots. This gives confidence to the buyer that there is a religious person tieing the knots with every prayer completed which is what makes prayer bracelets so valuable compared to industrial made prayer bracelets where knot is made by machine without prayer. This puts a real face behind each prayer bracelet and allows the priest, nun or monk to make a small living to pay their expenses while praying at the monastery. Prayer rope bracelets are knotted bracelets done by priests and monks. The story These bracelets come with a great story that people just love. Here's how the story goes. A very very long time ago there was a monk that was amongst the first to wander into the desert to spread the word of the Lord. This monk came up with the idea to use a rope to count his prayers. For every prayer he recited he made a knot.

Everything was just fine until one day during his prayer he got a vision of the Devil, which threw the monk out of concentration. The monk was surprised to see that the knots he made were mysteriously untied.

The monk tried to pray again, but everytime he got the same vision with the same result. But the brave monk was not to give up so easily. He kept on trying, but every passing day it got worse, the poor monk got very exhausted and it seemed the Devil would have his victory.

Thankfully Archangel Gabriel came to the rescue. Gabriel appeared in the monks dreams and showed him how to tie a special knot that vanquiches the Devil. The very next day the monk started to pray and to tie the special knot that consist of 7 small interlocking crosses. The Devil appeared again, but when he tried to untie the knots the special bond of the knots repelled him back to hell.

This brave humble monk stood his ground and kept on going even in his darkest hours.

Ultimately claiming victory over evil. We all know this legendary monk. He was Saint Anthony the Great.

So now you know who invented the prayer rope bracelets and necklaces we all still use today.

Well, it's no wonder that these bracelets and necklaces are so extremely popular.

BEACH PEBBLES—by collecting beach pebbles from beaches around the world and turning them into beads or keeping them natural, we are able to create souvenirs from stones that are not precious or semiprecious. By creating an inscribed identification of the name of the beach and country, people who visited that particular beach can take back a souvenir back to their friends or for themselves. For example a Tshirt has no relative value to it until the name HAWAI or FLORIDA printed on it. By creating jewelry which is made from actual pebbles from particular beaches like "The Florida Keys" we add value and collectability of otherwise non gem rocks.

PRECIOUS AND NON PRECIOUS METALS FROM PARTICULAR MINES.

PEARLS: Pearls come from different parts of the world like Australia, Tennessee, Indonesia, UAE, China, Japan and many more. Some are freshwater pearls like those from the Tennessee river that were farmed by such companies like American Pearl Company, others come from the sea like those from the Paspaley Pearl farm in Australia. It's hard for someone to tell where the pearl comes from once it's set into jewelry. And unlike diamonds which can be laser inscribed on their girdle which is concealed and does not damage the value of a diamond, laser inscribing a Pearl permanently damages the nacre of the Pearls surface thus decreasing its value.

NATURAL VS CULTURED PEARLS: Unlike transparent gems which can be examined by a gemologist using microscopes and other gemological instruments, pearls can only be identified using X-rays. It's nearly impossible for any expert to identify cultured vs natural pearls by visual examination alone. So collectability and appreciation of natural pearls vs their less expensive cultured imitations is not fully appreciated and recognized because they can't be laser marked like diamonds. By marking the inscription NATURAL PEARL on the jewelry where the Pearl is set in combination with several Gemological and origin inscriptions like TENNESSEE RIVER, USA, 3.38 carats etc gives the Pearl more collectability. The Tennessee river produces both natural and cultured pearls allowing each to be easily identified through centuries of use adding to their collectability value. Since pearls are permanently glued using strong epoxies and adhesives, the true weight of the Pearl is lost for life once set in jewelry. The reason for this is that a Pearl is an organic and porous material that can not be exposed to corrosive solvents that would be required to undue the glue bond. Thus once a Pearl is glued to jewelry via metal posts etc it's impossible to remove without damaging the Pearl. The fact that the Pearl is documented with its exact weight before attaching with epoxies to jewelry allows the true weight of the Pearl to be documented for that jewelry for the rest of the lifetime of the jewelry piece adding to its value and collectability. For those who are patriotic about where their products they buy come from the fact that a Pearl is documented as having been grown in the Tennessee river in the USA, also adds to its collectability value because the source of that Pearl will always remain attached to the jewelry piece of the customer.

HISTORICAL GEMS AND PEARLS: Recently a treasure of natural pearls and emeralds from the historical source of Santa Margarita island off the coast of Venezuela were discovered off the coast of Florida by Blue Water ventures. The pearls were examined by the GIA (Gemological Institute of America) as well as academics and historians and found to be over 500 years ago.

Once set these pearls history is lost. By setting them in jewelry inscribed with their history, origin and dates 1576 their value and collectability increases dramatically including the fact they are natural. Even more important allows the pearls to be easily sold because collectors proud to visually showoff the rarity of their Pearl jewelry. Without that inscription after being passed on to next generation the historical value of these pearls would be lost.

CORAL: There are several kinds of coral coming from different parts of the world. By inscribing jewelry with the origin of the corals it also adds to their collectability. In addition to collectability, by inscribing the source it also allows collectors to buy coral from regions not endangered or prohibited because of overfishing. Because ethical sourcing is important for collectors having jewelry inscribed with the source and year of the coral harvested allows them to know they are collecting ethically sourced coral.

MAMMOTH VS ELEPHANT IVORY: Mammoth ivory is from animals long extinct and by harvesting them where they are found they provide a much needed income by those who prospect for them. Equally the jewelry made by their tusks are highly collectible with a rich historical value. It's very hard to distinguish extinct Mammoth ivory jewelry from real ivory harvested by poachers on an elephant species which is in many parts of the world becoming extinct. By clearly inscribing jewelry using fossilized Mammoth tusks, collectors can proudly wear their mammoth ivory without any guilt of misunderstanding by their peers. It also promotes use of extinct ivory saving the lives of living elephants hunted for their ivory.

WOOD AND AMBER:

BRAND IDENTIFICATION: The use of overlay lasering also allows for jewelry to have brand logo or name easily identifiable and visible because of the strong contrast between the non tarnishing previous metal and the tarnishing metal like silver.

GEM DAMAGE

NATURAL VS SYNTHETIC DIAMONDS

MINING COST BENEFITS: Because most gems are generically marketed without the description of the source following the jewelry itself, the mines most competitive and cheap to mine are the only ones able to survive because of the competitive price of the final gem produced. By having descriptions of the sources where the gems come from allows for mining of less competitive mining operations to prosper because the consumer is willing to pay more because of its rarity vs it's being generically compared to a similar gem costing far less to mine. This allows for more jobs in mining giving beneficiation to miners, traders and cutters all over the world. Currently Quartz in jewelry is generically being used with total disregard to its place of origin because it's origin is lost once set in the jewelry. By creating Quartz jewelry from Crystals laser marked as coming from places like Arizona, Arkansas, Kashmir, Brasil, Madagascar, Sweden, Switzerland etc we now add value to sources that would never be used apart from their collectability because of their source. Many consumers very patriotic and nationalistic about the choices they make and having gems from localities associated with their ethnicity or personal choices adds more jobs to the mining and jewelry industry.

GEMCODES: By using gemological codes inscribed into the jewelry holding the gem that can be referenced on a website, we can add media information about that gem such as digital photos and video. That includes pictures and or videos of the mine, person who discovered it, person who cut it, a video of the gem being cut, a picture or video of the natural uncut rough of the gem before being cut, a description of the culture and people where gem was discovered, a map and or Satelite or drone view where the gem was discovered as well as laboratory pictures or scans of Gemological certificates about the gem.

GEM WEIGHT: A diamond set in jewellery cannot be weighed directly so its carat weight has to be calculated by measuring its dimensions, analysing its proportions and applying a mathematical formula. As the carat weight is a calculated value, you should state the carat weight as "estimated" or "approximate". Valuers need to acquire the skill of measuring dimensions of any diamond size and shape set in different forms of mounts (claw-set, rub-over, tension, pave, etc.) and of judging its proportions (see Cut grade section)

LAB REPORTS:
SIGNATURE OF GEM ARTIST:
GEM CARVING:
CATS CERTIFICATES (Cut At The Source):
LIMITED EDITIONS:
CHARITY EVENTS:
TRACEABILITY OF GEM:
ARTISINAL MINING VS INDUSTRIAL MINING: MINING COST BENEFITS: Because most gems are generically marketed without the description of the source following the jewelry itself, the mines most competitive and cheap to mine are the only ones able to survive because of the competitive price of the final gem produced. By having descriptions of the sources where the gems come from allows for mining of less competitive mining operations to prosper because the consumer is willing to pay more because of its rarity vs it's being generically compared to a similar gem costing far less to mine. This allows for more jobs in mining giving beneficiation to miners, traders and cutters all over the world. Currently Quartz in jewelry is generically being used with total disregard to its place of origin because it's origin is lost once set in the jewelry. By creating Quartz jewelry from Crystals laser marked as coming from places like Arizona, Arkansas, Kashmir, Brasil, Madagascar, Sweden, Switzerland etc we now add value to sources that would never be used apart from their collectability because of their source. Many consumers very patriotic and nationalistic about the choices they make and having gems from localities associated with their ethnicity or personal choices adds more jobs to the mining and jewelry industry.

DESIGNER CUTTING OF GEMS:
MORBID SYNTHETIC DIAMONDS:
TURQUOISE—
NATURAL VS TREATED SAPHIRE:
ANCIENT CERAMICS AND GLASS:
GEM PHOTO MICROSCOPY: In addition to all the Gemological photos and video describing the people and land around where the gem was discovered, pictures of the internal world of the gem and its Gemological inclusions can also be documented with a Code reference and photographic references on a website. The PHOTO ATLAS by John Koivula and Edward Gubelin is the bible of the Gemological World of inclusions when it comes to documenting specific inclusions found only in certain gems from particular countries and mines. Decades of photo microscopy gem inclusion research using high powered microscopes has yielded Gemological information that describes how particular gems have specific inclusions only found in those localities. Tremolite inclusions in Emerald for example is a strong indication that emerald comes from Zimbabwe. Three phase jagged edge inclusions is strong indication the emerald is from Colombia. By examining the inner world of inclusions in gems, scientists and gemologists can prove where that gens was from adding to its collectability and value. However that information never documented to be enjoyed by the eventual owner of the gem and jewelry piece.

In addition to the inclusions documenting and giving strong reference to the country of origin of the gem, inclusions can also prove if a gem is treated or not treated. By documenting microscope photographs of the the particular gem that has been documented, the owner of the gem and the jewelry where it is set, can see the inner world of that particular gem and its inclusions. Thus adding more collectability to that gem as well as value. To sum up, the gem code inscribed in the jewelry about the gem becomes a reference on a website that allows the owner to information and media that can not be be visually stored on the jewelry or gem itself.

ORIGIN OF GEMS: Apart from the higher value of gems coming from particular historical origins like Mogok Burma and Kashmir India, it's a proven fact that Mineral Crystals (Specimens) in which the origin of mineralogical crystal specimen was documented, have a far higher collectability and value than minerals in which their origin was lost. By documenting and inscribing on the jewelry the Gemological References as well as the geological origins of the gems their value and collectability also increases like the minerals in private collections as well as public Museums. Anyone who has ever visited a Mineralogical Museum or Natural Science Museum will notice that all the minerals on exhibit have a country of origin and sometimes the date description those minerals were discovered and mined. Tourmaline crystals from particular mines in California called Blue Cap Tourmalines have fetched values in the millions vs similar tourmalines from other regions.

HIGH CONTRAST ENGRAVING USES:
Ancient Coins:
TEXTURED SILVER—By using the laser to expose the silver beneath the gold (or other precious layer on top) we are able to then texture the silver into a velvet texture using a needle repeating hammer. This creates a difference in texture on the surface of the silver allowing a greater visual contrast between the textured silver and the shiny gold. Once the silver is oxidized black then the contrast even bigger.

By maintaining a history of the gem there is more value added to both the gem and the jewelry because the consumer knows the gem is not a conflict gem. However, to obtain the benefits and advantages of adding or archiving the information about gems this gives the gems a personality or identity significance that adds to its value and collectability. However, this cannot be achieved by marking the gems themselves. However, by inscribing such information on the jewelry supporting the gem or gems this can be easily achieved at minimal cost or effort.

By inscribing special gem codes on the jewelry about the gem, it's also easy for the consumer to trace the origin of the gem from mines to market which will also include in some cases the picture of the original rough, who discovered it, who cut it as well as which treatment was used. By maintaining a history of the gem there is more value added to both the gem and the jewelry because the consumer knows the gem is not a conflict gem.

The invention claimed is:

1. A method of identifying and tracing at least one salient property of a gem comprising a laser mark, the method comprising:
  obtaining the gem;
  obtaining a jewelry setting comprised of multiple layers of metal, the multiple layers of metal including an upper layer of a first metal and a lower layer of a second metal, the second metal being more susceptible to oxidation than the first metal;

determining identification information from the laser mark of the gem, the determined identification information including the at least one salient property of the gem;

transferring the determined identification information to a metal portion of a jewelry setting, at least in part by:
  using a laser to engrave the determined information through the first metal to expose the second metal;
  subjecting the exposed second metal portion to a first sulfur oxidation process to affect the second metal and impart a first color that provides a first contrast to a color of the second metal to enhance visibility of the engraved determined information; and
  applying a second liquid oxidizer to the exposed second metal portion to further oxidize the exposed second metal portion and impart a second color to the second metal that provides a second contrast color to the color of the second metal to further enhance visibility of the engraved determined information, the second color darker than the first color;

mounting the gem on the jewelry setting; and ascertaining the at least one salient property of the gem by examining the transferred identification information on the jewelry setting on which the gem is mounted.

2. The method of claim 1, wherein said at least one salient property of the gem comprises at least one of: lab certificate number; name of continent, country, city, or location where the gem was mined; whether the gem natural or has been treated; whether the gem was cut at the source (C.A.T.S.) where the gem was mined; the year that the gem was mined or discovered; a name of the gem; a grade of the gem; a carat weight of the gem; a brand name or trademark associated with the gem; name of animal, metal or plant species from which the gem originated; name of rough or uncut gem designation; color code for the gem; name of artisan or cutter of the gem; name of owner of the gem; or name of donor of gem.

3. The method of claim 1, wherein the transferred identification information is represented on the metal portion as text or designs that are visible and legible to an unaided human eye.

4. The method of claim 1, wherein the transferred identification information conveys information even when the laser mark on the gem cannot be clearly visualized because of placement of the gem in the jewelry setting.

5. The method of claim 1, wherein the transferring the determined identification information further comprises at least one of: blackening, oxidation, tarnishing, laminating, layer addition of metals, engraving, inlays, overlays, plating, ceramics, enameling, raised letters, carving, or forming a micro mosaic.

6. The method of claim 1, wherein examining the transferred identification information on the jewelry setting on which the gem is mounted is performed using a naked eye.

7. The method of claim 1, wherein the first color change creates a gray color, and the second color change creates a black color.

8. The method of claim 1, wherein the second metal is silver.

9. The method of claim 1, wherein the first metal is selected from the group consisting of: gold, platinum, and palladium; and the second metal is silver.

10. The method of claim 1, wherein the first metal is a non-oxidizing metal and the second metal is an oxidizing metal.

* * * * *